April 4, 1961
H. S. BELL, JR
2,977,754
ROCKET CHAMBER WITH MULTI-PASS
AXIAL FLOW COOLANT PASSAGEWAYS
Filed Jan. 29, 1958
2 Sheets-Sheet 2
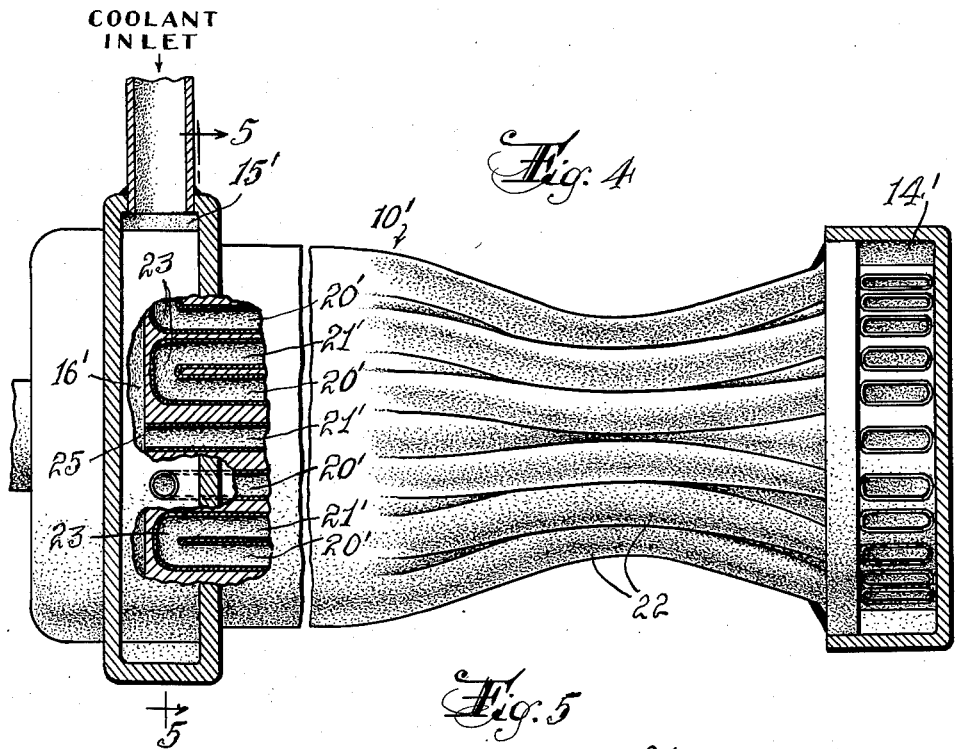
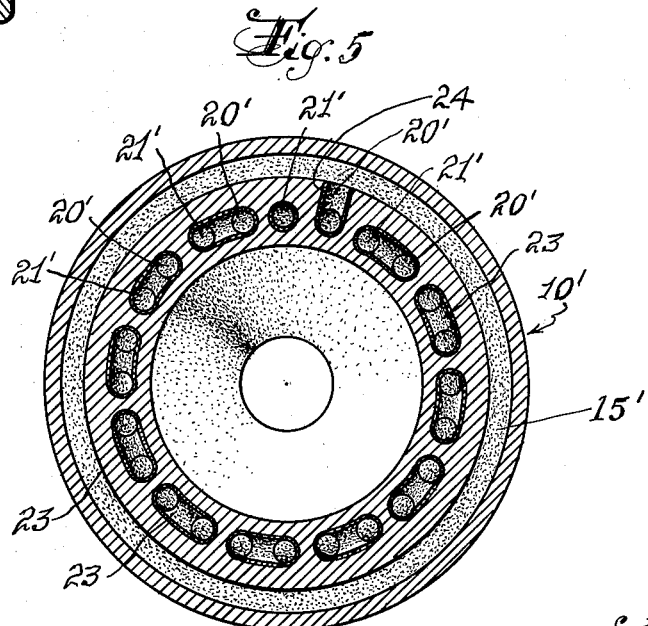
Inventor:
Harold S. Bell Jr.
By William R. Wright J.
Agent.

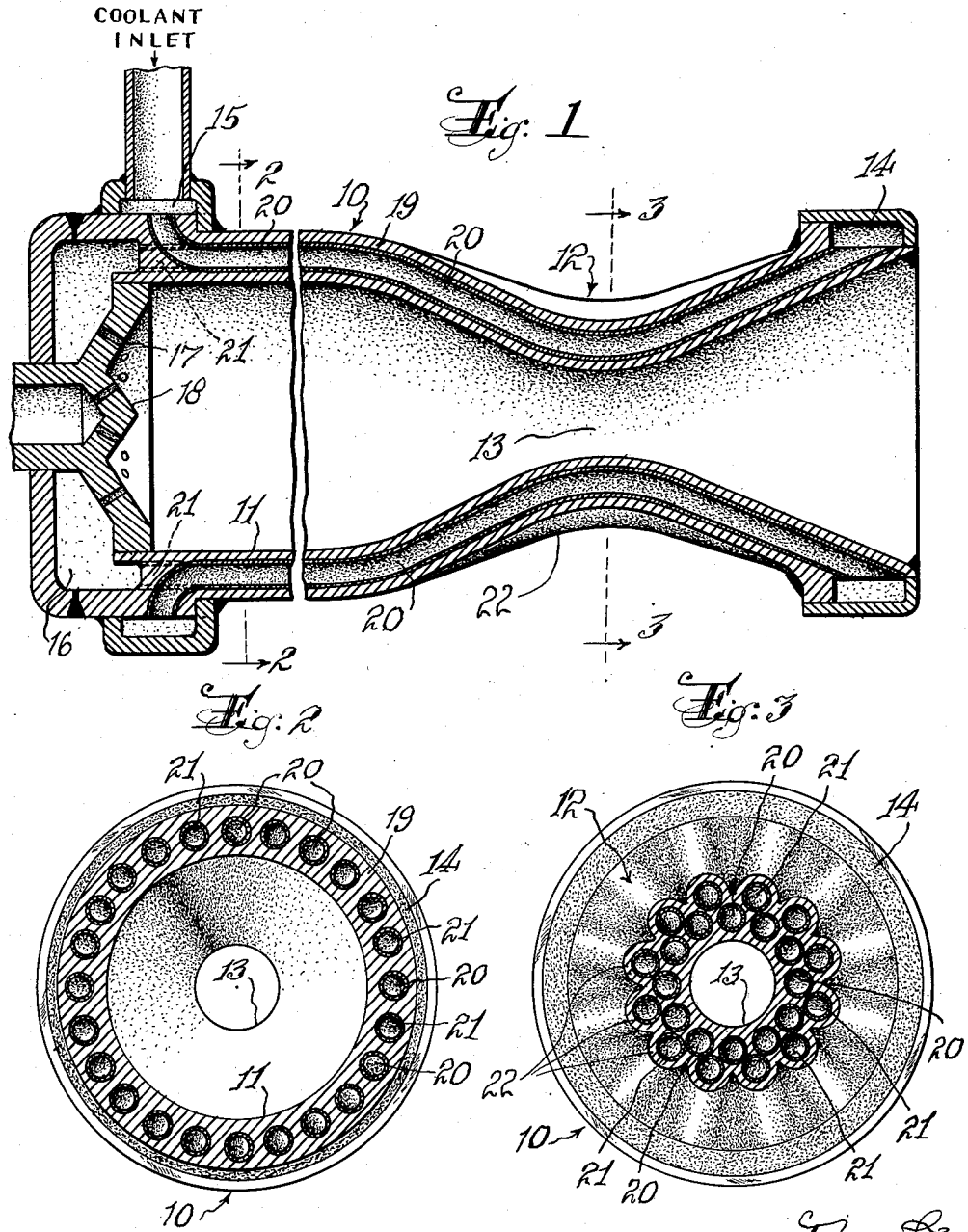

United States Patent Office 2,977,754
Patented Apr. 4, 1961

2,977,754

ROCKET CHAMBER WITH MULTI-PASS AXIAL FLOW COOLANT PASSAGEWAYS

Harold S. Bell, Jr., Whippany, N.J., assignor, by mesne assignments, to Thiokol Chemical Corporation, a corporation of Delaware Filed Jan. 29, 1958, Ser. No. 712,039
5 Claims. (Cl. 60—35.6)

The invention relates in general to cooled rocket thrust chambers, and has particular reference to chamber wall cooling means wherein the coolant passageways are axially arranged within the chamber wall.

Axial flow cooling passageways are preferred to those which are arranged in some other manner, such as helical passageways, because of the low hydraulic friction loss in the former, but are practical only for large coolant flow in large motors. It is therefore to large motors with comparatively thick chamber walls that my present invention especially pertains.

The problem of providing for efficient axial coolant flow is influenced by the currently conventional axial contour of a thrust chamber, wherein there is an upstream substantially cylindrical combustion chamber and a downstream convergent-divergent nozzle.

Prior to my present invention, it was the practice in the design of thrust chambers having axial coolant flow to arrange the passageway-forming means, such as embedded tubes, in such a manner that at any cross-sectional plane throughout the length of the chamber all tubes were located in the circumference of a circle concentric with the thrust chamber axis. With such an arrangement, great difficulty in manufacturing the tubes is encountered because of the limitations imposed by the "necking down" or nozzle portion of the rocket motor. The difficulties were manifested by a changing cross-sectional tube area in the nozzle section and by difficulties encountered when bending the tubes at this section in addition to the change in area hereinbefore mentioned. To overcome these difficulties, the usual practice was to use a smaller number of tubes. However, this solution is unsatisfactory because fewer tubes mean inadequate cooling.

With the above-enumerated disadvantages of the prior art structure in mind, it is the primary object of my present invention to provide an improved arrangement of coolant passageway-forming tubes which will permit the use of a greater number in a thrust chamber of given diameter than heretofore considered to be possible.

Further objects, advantages and features of the invention will become apparent as the following specific description is read in connection with the accompanying drawings, in which:

Figure 1 is a longitudinal section of a rocket thrust chamber of regenerative cooling type constructed in accordance with the preferred embodiment of the invention; Fig. 2 is a transverse section on line 2—2 of Fig. 1; and Fig. 3 is a similar view on line 3—3 of Fig. 1.

Fig. 4 is a fragmentary side elevation, partly in longitudinal section, of a regenerative cooling thrust chamber having a modified arrangement of coolant passageways; and Fig. 5 is a transverse section on line 5—5 of Fig. 4.

Referring now in detail to the drawings, wherein like reference characters designate corresponding parts in the several views, it will be observed that two equivalent embodiments of the invention are illustrated. In each instance, the novel arrangement of passageway-forming tubes is applied to a thrust chamber of the regenerative cooling type but it is to be understood that the invention is equally applicable to thrust chambers which employ a relatively inert cooling fluid, such as water, instead of one of the liquid propellants.

In the embodiment shown in Figs. 1 to 3, the thrust chamber 10 is of conventional design and includes a cylindrical combustion chamber section 11 and a convergent-divergent nozzle section 12 having the usual constricted throat 13. At the downstream end of nozzle section 12 there is a collector annulus 14. At the upstream end of combustion chamber section 11, are an annular inlet manifold 15, which may be connected to a source of supply (not shown) of one of the liquid propellants, such as the fuel component of combustion, and a substantially coaxial outlet manifold 16, which is in direct communication with injection orifices 17 of injector head 18.

The axial flow coolant passageways in the wall of thrust chamber 10 are represented as being formed by embedding tubes in the matrix of the casting 19. It is to be understood, however, that it is within the scope of the invention to form the coolant passageways by any equivalent means or mode of operation, such as by drilling them in the chamber wall (not shown). For simplicity of terminology, the passageway-forming means of the present invention will be called "tubes" hereinafter.

The plural tubes that are embedded in the wall of thrust chamber 10 are grouped in circumferentially adjacent multi-pass pairs of respective first-pass and second-pass tubes 20 and 21. By "multi-pass" is meant that each pair of mated tubes conducts the coolant fluid more than once through the chamber wall from end to end thereof. "First pass" tube 20 conducts the coolant fluid at its initial relatively cool temperature axially through the chamber wall for the first time, whereas "second-pass" tube 21 returns the coolant fluid for the second time through the said wall.

The upstream end of first-pass tube 20 of each pair is communicatively connected to inlet manifold 15 and the downstream end thereof is similarly connected to collector annulus 14. The downstream end of second-pass tube 21 of the same pair is communicatively connected to collector annulus 14 and its upstream end is similarly connected to outlet manifold 16.

As shown in Fig. 2, in the combustion chamber section 11 of the device, all coolant tubes 20—21 lie in the circumference of a circle substantially midway between the outer and inner peripheries of the thrust chamber wall. The principal novel feature of the invention resides in the tube arrangement in the thickened portion of the thrust chamber wall surrounding throat 13 of nozzle section 12.

In this throat region, the first-pass tube 20 of each pair is arranged closer to the thrust chamber axis than the mated second-pass tube 21, in a radially inner circumferential row coaxial with an outer row of second-pass tubes, as disclosed in Fig. 3. Due to this relative arrangement, the respective first-pass and second-pass tubes of all pairs are staggered in relation to each other and substantially equally spaced circumferentially and radially. Each inner-row first-pass tube thus is nested in the interval between the two adjacent second-pass tubes of the outer row. An important effect is the practicability of using many more coolant tubes than could be accommodated in the constricted throat region of nozzle section 12 if it were not for the staggered arrangement shown in Fig. 3. The desired end result is the conduction of a greater volume of coolant fluid in a given time through the hottest region of the thrust chamber than has been considered to be possible heretofore. Moreover, the coolant fluid at its initial cool temperature is conducted closer to the throat 13 by first-pass tubes 20 than in its return passage through second-pass tubes 21.

Another important feature of construction in the embodiment of the invention disclosed in Figs. 1 to 3 appears in Fig. 3 in particular. This is the fluted formation of the outer peripheral portion of the thrust chamber wall in the medial transverse plane of throat 13. External fluted portions 22 of the throat wall are concentric to the correspondingly located portions of second-pass tubes 21 and provide uniformly thin outer walls to facilitate in the dissipation of heat to the outside air.

In the operational use of the embodiment of my invention disclosed in Figs. 1 to 3, coolant fluid, which in the illustrated example is one of the propellant liquids, circulates through the thrust chamber wall in a manner to attain cooling effects of maximum efficiency. From inlet manifold 15, the fluid passes through first-pass tubes 20 to collector annulus 14 and thence back through second-pass tubes 21 to outlet manifold 16 of injector head 18. Consequently, the coolant fluid, while at its initial cool temperature, approaches closer to the inner periphery of the throat wall on its first pass than on its return second pass, when its temperature has previously been elevated by the first pass.

In the embodiment disclosed in Figs. 4 and 5, the passageway-forming tubes may be considered as being arranged in pairs of first-pass and second-pass tubes 20' and 21', but the upstream ends of all tubes are continuously connected by circumferential portions 23 except at one location in the 360 degrees of arc. Here, the upstream end of the first-pass tube 20' of one pair is communicatively connected at 24 to inlet manifold 15' (Fig. 5), whereas the upstream end of the adjacent second-pass tube 21' of another pair is similarly connected at 25 to outlet manifold 16' (Fig. 4). The downstream ends of all tubes may be connected communicatively, as in the Figs. 1 to 3 embodiment, to a collector annulus 14', or may be interconnected as at the upstream end of thrust chamber 10' (not shown).

Operational use of the modified form of the invention differs from the Figs. 1 to 3 embodiment in that the coolant fluid circulates through the combined lengths of all multi-pass tubes 20'—21' and collector annulus 14' after it leaves inlet manifold 15' and before it returns to outlet manifold 16'.

While there have been shown and described and pointed out the fundamental novel features of this invention as applied to only two structural embodiments, it will be understood that various omissions and substitutions and changes in the form and details of the device illustrated and its operation may be made by those skilled in the art without departing from the spirit of the invention. It is the intention, therefore, to be limited only as indicated by the scope of the following claims.

I claim:

1. In a fluid-cooled rocket thrust chamber, the combination of: a wall of conventional axial contour including an upstream cylindrical combustion chamber section and a downstream convergent-divergent nozzle throat section whose wall has a cross-sectional area much smaller than that of the combustion chamber section; plural axially extending circumferentially spaced multi-pass tubes embedded in said wall to form coolant passageways therein, alternate tubes being arranged with the portions thereof in the nozzle throat section located radially closer to the thrust chamber axis than corresponding portions of the adjacent other tubes and being staggered circumferentially with respect to said adjacent other tubes in an inner circumferential row wherein each tube is nested in the interval between said adjacent other tubes of an outer row in a manner to accommodate all of the tubes in the constricted nozzle throat section wall.

2. The invention defined in claim 1, to which is added: substantially coaxial annular inlet and outlet manifolds located at the upstream end of the thrust chamber wall; and a collector annulus located at the downstream end of said wall, the coolant passageway-forming tubes being arranged in pairs of circumferentially adjacent tubes of which one is a first-pass tube to deliver coolant fluid downstreamward and the other is a second-pass tube to return coolant fluid upstreamward, the downstream ends of both tubes of each pair being communicatively interconnected, the upstream end of the first-pass tube of one pair being communicatively connected to the inlet manifold and the corresponding end of the second-pass tube of the circumferentially adjacent pair being communicatively connected to the outlet manifold, and the upstream ends of all other second-pass tubes being communicatively connected to the upstream ends of the respective circumferentially adjacent first-pass tubes to complete the fluid circuit from the inlet manifold to the outlet manifold.

3. The invention defined in claim 1, wherein the thrust chamber wall in the region of the nozzle throat is provided with external longitudinal flutes substantially coaxial in relation to the respective alternate tube portions of the outer row that are located radially more distant from the chamber axis than the other portions, whereby the thickness of the outer wall is uniform to facilitate heat radiation.

4. The invention defined in claim 1, to which is added: substantially coaxial annular inlet and outlet coolant manifolds located at the upstream end of the thrust chamber wall; and a collector annulus located at the downstream end of said wall, the coolant passageway-forming tubes being arranged in pairs of circumferentially adjacent tubes of which one tube of each pair is a first-pass tube to deliver coolant fluid downstreamward and the other is a second-pass tube to return coolant fluid upstreamward, the downstream ends of both tubes of each pair being communicatively connected to the collector annulus, the upstream end of the first-pass tube of each pair being communicatively connected to the inlet manifold and the upstream end of the second-pass tube of each pair being communicatively connected to the outlet manifold, the inner row of tubes which are more closely spaced radially from the thrust chamber axis in the nozzle throat section than the others being first-pass tubes, whereby coolant fluid at initial temperature is delivered directly to the hottest region of the nozzle throat.

5. The invention defined in claim 1, to which is added: substantially coaxial inlet and outlet coolant manifolds located at the upstream end of the thrust chamber wall, the coolant passageway-forming tubes being arranged in pairs of circumferentially adjacent tubes of which one tube of each pair is a first-pass tube to deliver coolant fluid downstreamward and the other is a second-pass tube to return coolant fluid upstreamward, the upstream end of the first-pass tube of each pair being communicatively connected to the inlet manifold and the upstream end of the second-pass tube of each pair being communicatively connected to the outlet manifold, the first-pass tube of each pair having its nozzle throat portion located in the inner circumferential row in staggered and nested relation to the adjacent second-pass tubes of the outer circumferential row; and means establishing intercommunication between the downstream ends of the first-pass and second-pass tubes of each mated pair.

References Cited in the file of this patent

UNITED STATES PATENTS

| 2,705,399 | Allen | Apr. 5, 1955 |
| 2,838,961 | Dalgleish et al. | June 17, 1958 |
| 2,844,939 | Schultz | July 29, 1958 |
| 2,880,577 | Halford et al. | Apr. 7, 1959 |
| 2,951,336 | Mueller | Sept. 6, 1960 |

FOREIGN PATENTS

| 459,924 | Great Britain | Jan. 18, 1937 |
| 201,413 | Australia | Mar. 22, 1956 |